(No Model.) 3 Sheets—Sheet 1.

P. MULLANE.
CORN SHOCKER.

No. 552,135. Patented Dec. 31, 1895.

Witnesses:
T. S. Elmore
D. H. Gallatin

Inventor:
Patrick Mullane
By P. T. Dodge
Att.

(No Model.)

P. MULLANE.
CORN SHOCKER.

No. 552,135. Patented Dec. 31, 1895.

3 Sheets—Sheet 2.

on line a-a.

Witnesses:
F. A. Elmore
D. F. Gallatin

Inventor:
Patrick Mullane
By P. Y. Dodge
Atty (No Model.)  3 Sheets—Sheet 3.

P. MULLANE.
CORN SHOCKER.

No. 552,135. Patented Dec. 31, 1895.

Witnesses:
F. A. Elmore
D. P. Gallatin

Inventor:
Patrick Mullane
By P. T. Dodge
Atty.

UNITED STATES PATENT OFFICE.

PATRICK MULLANE, OF MOLINE, ILLINOIS.

CORN-SHOCKER.

SPECIFICATION forming part of Letters Patent No. 552,135, dated December 31, 1895.

Application filed December 3, 1894. Serial No. 530,735. (No model.)

*To all whom it may concern:*

Be it known that I, PATRICK MULLANE, of Moline, county of Rock Island, and State of Illinois, have invented a new and useful Improvement in Corn-Shockers, of which the following is a specification.

My invention relates to corn-shocking machines which are adapted to receive the cut corn and permit the same to be bound into shocks, which latter are dumped or discharged to the ground.

The invention has reference more particularly to machines of this character in which the floor or receiving-platform is composed of sections or slats which when in closed position afford a temporary support for the corn and which when opened will permit the bound shock to drop to the ground.

My device embodies various improvements in machines of this general type, having in view simplicity of construction and effectiveness of operation.

Figure 1:
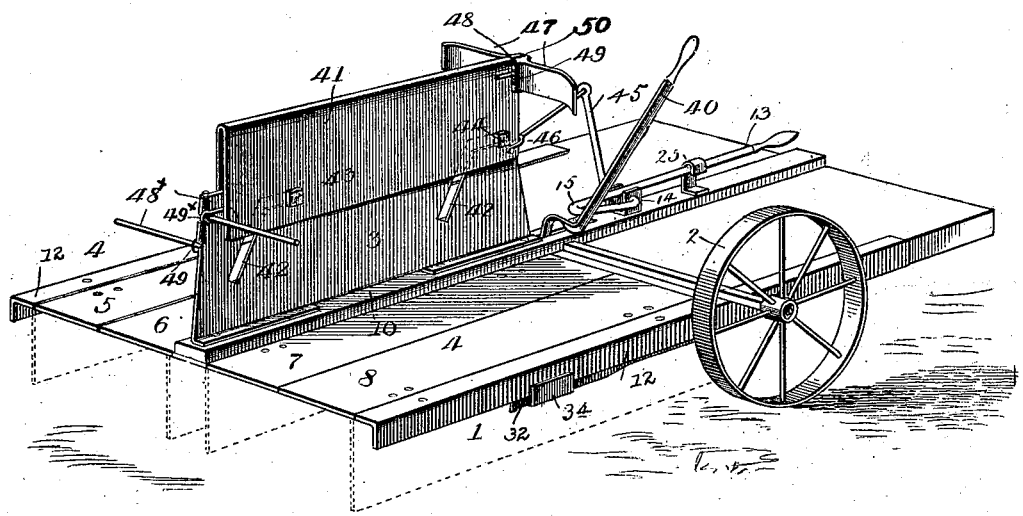
Figure 2:
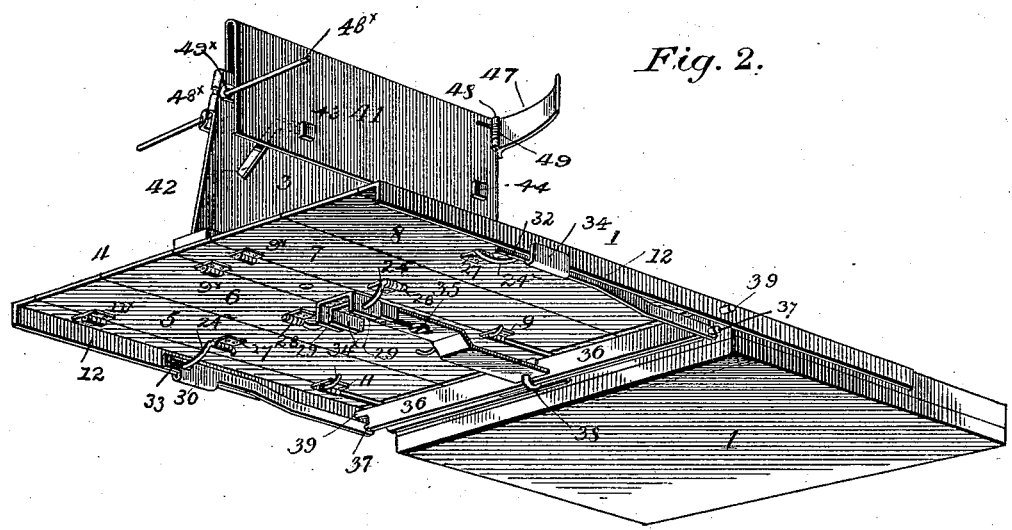
Figure 3:
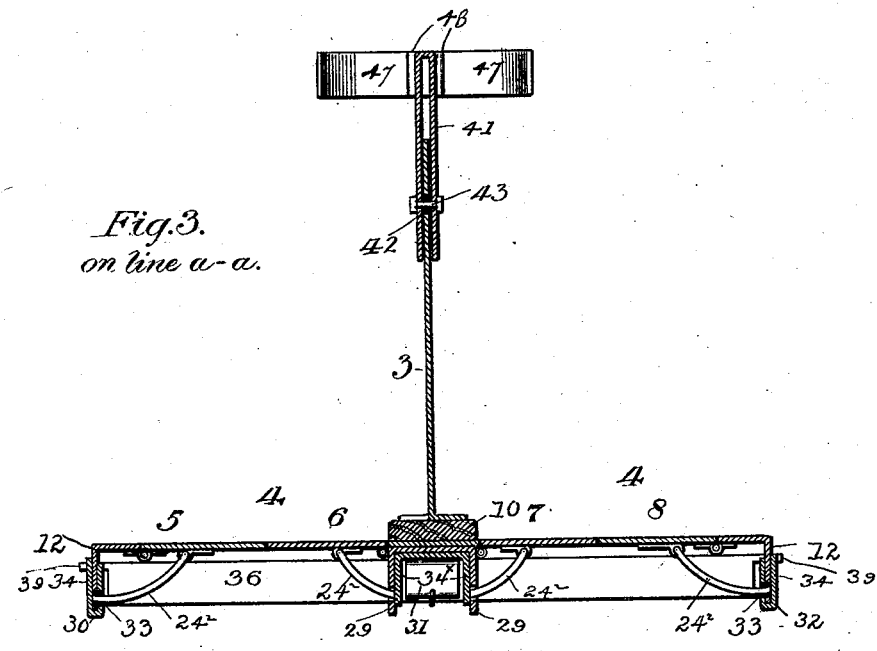
Figure 4:
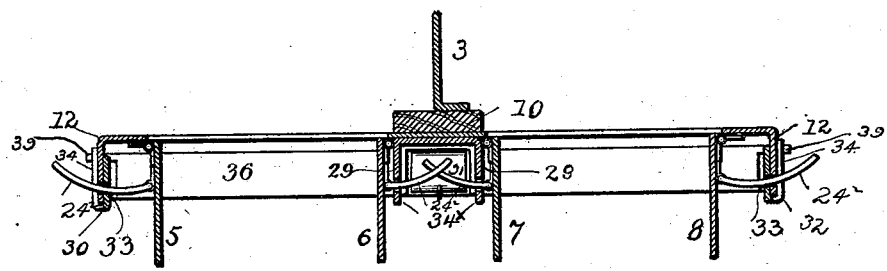
Figure 7:
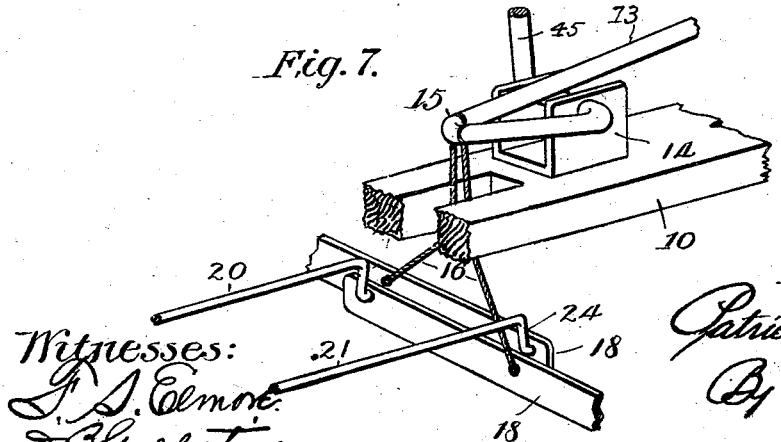
Figure 6:
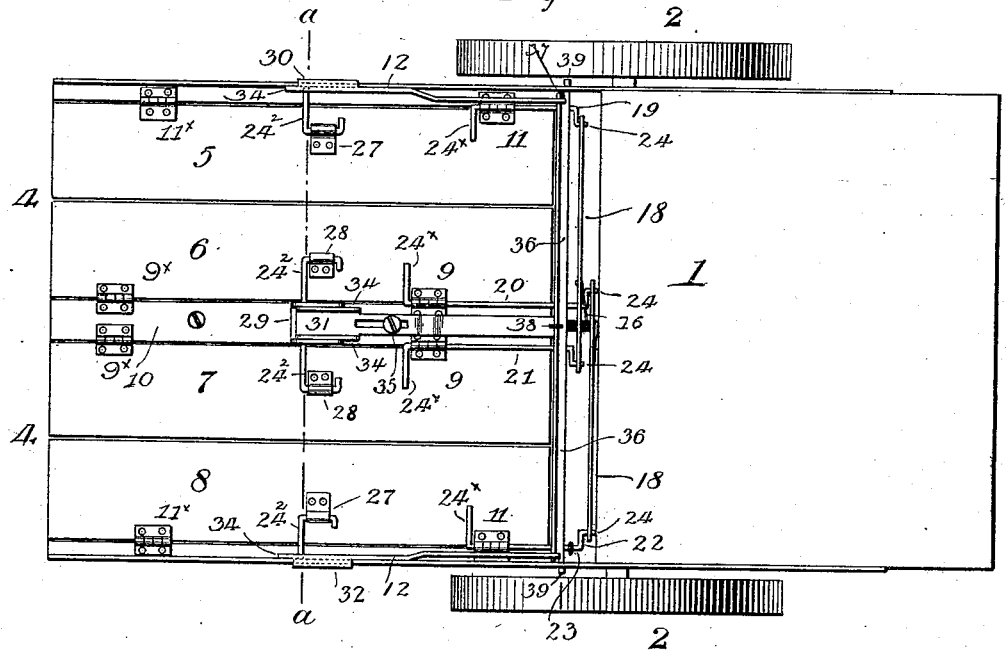
Figure 5:
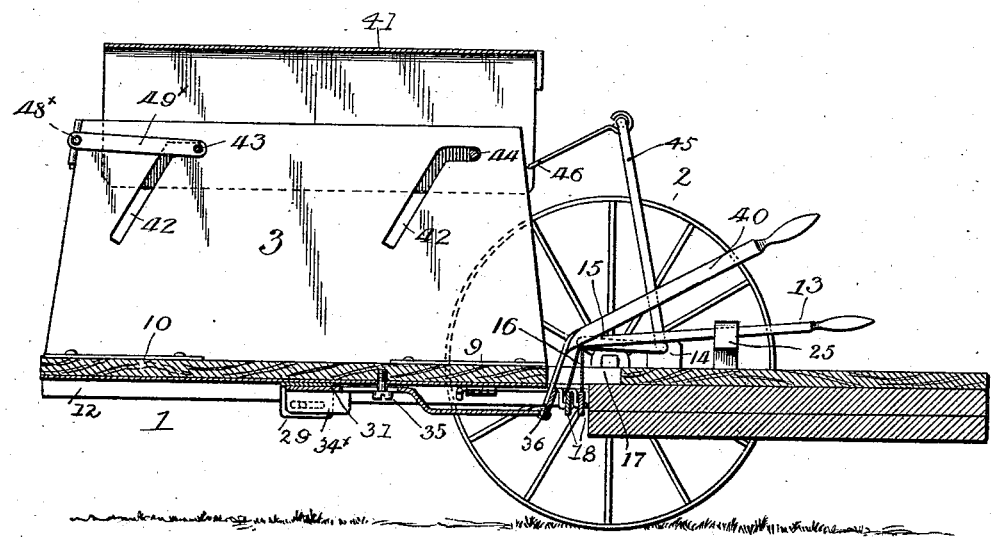

Referring to the drawings, Figure 1 is a perspective view of my improved corn shocker. Fig. 2 is a perspective view of the same as viewed from beneath. Fig. 3 is a transverse vertical section on the line $a\,a$, Fig. 6, showing the platform closed and in the position to receive the cut stalks. Fig. 4 is a similar view showing the platform in open position to permit the bound shock to be discharged to the ground. Fig. 5 is a longitudinal central section through the machine. Fig. 6 is a bottom plan view of the machine. Fig. 7 is a perspective view on an enlarged scale of the end of the lever and a portion of the links for operating the leaves to dump the shock.

My improved corn-shocker is adapted to receive the cut stalks of two rows, those of each row being placed on opposite sides of the machine, where they are bound and dumped to the ground. The machine therefore comprises a frame 1, mounted preferably on ground-wheels 2. The frame is provided at its rear with a receiving-platform separated by a vertical divider-board 3, the provision of this divider constituting in effect two platforms 4 on opposite sides of the machine, which platforms are adapted to receive the cut stalks of the two rows respectively and give support to the same while being bound into a shock. The platforms are in the form of four sections or leaves 5, 6, 7, and 8, the two inner leaves 6 and 7 being connected at their inner edges by front and rear hinges 9 $9^\times$ to the opposite sides of a central rearward extension 10, projecting from the frame. The two outer leaves 5 and 8 are connected at their outer edges by front and rear hinges 11 $11^\times$ to two bars 12 extending rearwardly from the opposite sides of the frame, as plainly shown in Fig. 1.

The construction described is such that the two leaves of each platform may be extended horizontally, as shown in Fig. 3, in which position they will give support to the cut corn and permit the same to be bound into shocks, or the leaves may be turned downward on their hinges to vertical positions, as shown in Fig. 4, thus opening the platform to permit the shocks to be dumped to the ground. These movements of the leaves are effected by means of a lever 13, mounted on a horizontal transverse axis in the upper end of a bracket 14, fixed to the frame. The lever is formed with a rearward extension 15, to the end of which is connected two chains or ropes 16, extending downward through a vertical opening 17 in the frame to the under side of the same. The ends of these ropes are connected near their inner ends to two horizontal transverse links 18, extending in opposite directions past the vertical opening in the frame and overlapping, as plainly shown in Figs. 6 and 7. The points of connection of the ropes with the links are beyond the opening at opposite sides of the same, the result being that when the ropes are pulled upward by the lever the two links will be moved endwise inward in opposite directions. The inward movement of the links is caused to lift the leaves and close the platforms through the medium of four rock-shafts 19, 20, 21, and 22, extending longitudinally of the leaves a short distance rearward from their front ends. The front ends of the rock-shafts are mounted in suitable bearings 23 on the under side of the frame and are provided with crank-arms 24, which are jointed respectively to the inner and outer ends of the two links 18 before alluded to. The rear ends of these shafts are also mounted in bearings, in the present instance, formed by the four forward hinges by which the leaves are jointed, as before described. The shafts constitute the axes or pivots of the hinges, and rearward of the same they are provided each with a lateral arm or crank $24^x$, which arms extend beneath the leaves and when in a horizontal position support the same.

The construction described is such that when the two links are moved outward endwise the shafts will be rocked and the crank-arms on their rear ends turned downward vertically, and the supports for the leaves being thus removed they will be permitted to follow the arms, thus opening the platform. It will be seen therefore that when the ropes are drawn upward by depressing the front end of lever 13 the links will be moved inward and the crank-shafts turned to cause the crank-arms to extend in horizontal positions beneath the leaves, affording supports for the same. The parts are held in this position by engaging the lever beneath a laterally-bent end of a bracket 25, fixed to the frame in front of the bracket 14.

In order that the leaves may be held securely in a closed position and may be prevented from accidentally opening, I provide a locking mechanism for the same, now to be described. About midway of its length each leaf is provided with a pivoted arm $24^2$, those of the two outer leaves being bent laterally at their inner ends and mounted in bearings 27, fixed to the outer leaves, the outer ends of the arms extending through openings formed in the rearwardly-extending bars 12. The arrangement is such that when the leaves are in a horizontal position the ends of the arms will rest in the openings in the bars, and when the leaves are turned downward the arms will extend through the openings and project beyond the bars. The arms of the two inner leaves are likewise bent laterally at their ends and mounted in bearings 28, fixed to the inner leaves, the opposite ends of the arms extending inward through openings formed in two downwardly-extending plates 29, projecting from the under side of the central rearwardly-extending frame-portion 10. In connection with these arms I provide three slides or stops 30 31 32 arranged to be moved in front of the ends of the arms and prevent their movement when the leaves are in a horizontal position, or adapted to be moved free of the arms and allow the leaves to be turned downward to open the platform. The two outer slides are in the form of bars which at their rear ends are slotted longitudinally, as at 33, for the passage of the arms, and have adjacent to the slots lips 34 extending on the outer side of the bars 12. The rear ends of the lips terminate a short distance from the ends of the slots, so that when the slides are moved forward the arms may pass through the slots; but when moved rearward the lips will extend in front of the arms and prevent the opening of the leaves. The central slide consists of a plate having at its rear end two downwardly-extending flanges $34^x$, adapted to be moved between the two plates 29 and in front of the arms extending through said plates. This plate is slotted about midway of its length, and a screw 35 passes the slot and up into the central extension of the frame and serves to hold the plate in place, but permits its endwise movement. At their forward ends the three slides are jointed to a transverse rocking plate 36, the forward ends of the two outer slides being provided with holes to receive fingers 37 projecting laterally from the opposite ends of said plate at its lower edge. The central slide is connected at its forward end to the lower edge of the rocking plate by means of a link 38. The rocking plate is provided at opposite ends at its upper edge with laterally-extending trunnions 39, which are mounted in openings formed in the two side frame-bars 12. By rocking this plate on its axis the lower edge will be caused to move back and forth, and owing to its connection with the slides will cause them to partake of corresponding movements in front of the arms on the leaves or free of the same, as the case may be. The rocking plate is moved by means of an arm or lever 40, having its front end extended above the frame and its rear end extending downward through the opening 17 therein to the under side of the frame, where it is rigidly connected to the rocking plate. By depressing the lever 40 the slides are moved forward in front of the arms and serve to prevent their movement, thus retaining the leaves in a horizontal closed position. When the leaves are to be opened the lever is raised, which movement will cause the slides to be withdrawn from the arms, so that their free movement will be permitted.

In practice, the leaves being closed, the lever 13 locked in its depressed position, and the lever 40 depressed with the slides in front of the arms, the cut stalks are stacked on the platforms on opposite sides of the divider, and when sufficient quantities have accumulated they are bound at their upper ends into shocks. To dump or discharge the shocks the lever 13 is first released and then lever 40 raised to unlock the leaves, which will immediately drop downward by gravity under the weight of the shocks and permit the same to fall to the ground.

The above operations are performed while the machine is in motion, and when the leaves are opened and the shocks fall to the ground the machine by its advance frees itself of the same and the parts of the mechanism are restored to their former positions preparatory to receiving another load.

In order that when the shocks are dumped there will be no liability of their being caught and held by the parts of the machine, I provide the divider with a movable cap 41, so mounted that when the shocks are dumped the cap may be moved rearward and downward and, as it were, follow the movement of the shock. The cap is in the form of a folded plate extending on opposite sides of the divider, the latter being provided at its front and rear with guide-slots 42, extending at an inclination upward and then horizontally forword a short distance. Pins 43 and 44 extend through the cap-plate near its lower edge and into the slots and serve to guide the cap and cause it to follow the direction of the slots. This cap is moved by means of the lever 13, which is provided with an upwardly and rearwardly extending arm 45 connected at its end by a link 46 to the front end of the cap. The arrangement of the parts is such that when the lever is unlocked and raised to allow the leaves to open, the cap will be caused to first move rearward until the pins reach the inclined slots, when on the continued movement of the lever 13 the cap will move downward and rearward. This movement of the upper edge of the divider will effectively prevent any resistance being offered to the discharge of the shock and will cause the same to leave the machine with a free and easy movement.

In order that the discharge of the shock may be aided and effected with certainty, I provide the forward end of the cap with two laterally-extending arms 47, which are jointed at their inner ends on vertical axes 48, and are held yieldingly in an extended position at right angles to the cap by spiral springs 49 bearing against the cap and the rear sides of the arms. The arms are prevented from being moved forward beyond the right-angular position by means of two lugs 50, fixed to the inner ends of the arms and abutting when the latter are extended. When the cap is moved rearward by raising the lever to dump the shock, these arms will encounter the latter and positively push it rearward from the machine. By hinging the arms they will be permitted to yield in a rearward direction, so that there will be no obstruction offered to the passage of stalks from the front end of the machine onto the receiving-platforms.

At its rear end the divider is provided with two horizontal arms 48×, pivoted on vertical axes and extending through the rear perforated ends of two links 49×, the front ends of which are jointed to the pin 43 on the cap. These arms, when the cap is in a raised position with the platforms closed, are held outward at right angles to the divider, and in connection with the arms at the front of the cap they retain the stalks to form the shocks in position. When the shock is to be dumped the downward and rearward movement of the cap will through its connection with the arms turn the same rearward on their axes until they extend longitudinally of the divider, in which position no obstruction is offered to the free discharge of the falling shock.

Having described my invention, what I claim is—

1. In a corn shocker the combination with a platform adapted to be operated to dump the shock, of the vertical standard rising therefrom, the movable cap on the top of the standard, the laterally extending arms at the front and rear of the same, connections for moving the cap rearwardly when the platform is operated to dump the shock, and connections for moving the rear arm to permit the discharge of the shock.

2. In a corn shocker the combination with a platform adapted to dump the shock, of the central vertical standard rising therefrom, the rearwardly moving cap on the top of the standard, the oppositely extending horizontal arms on the forward end of the cap, the horizontal arms pivoted to the rear end of the standard on vertical axes, connections between the cap and said arms and mechanism for moving the cap rearward.

3. In a corn shocker the combination with the vertical standard rising from the platform and having guiding slots, of the cap applied to the top of the standard, pins fixed to the cap and engaging in said slots, lateral arms on the forward end of the cap, lateral arms pivoted to the rear end of the standard on vertical axes, links pivoted at their front ends to the rear pin and provided at their rear ends with openings to receive the arms, and mechanism for moving the cap rearward.

4. In a corn shocker the combination with the downwardly moving leaves constituting the receiving platform, of rock-shafts extending in line with the axes of the leaves, lateral arms on the ends of said shafts extending beneath the leaves, crank arms on the forward ends of the rock-shafts, oppositely moving links connected to said crank arms, a lever and suitable connections between the lever, and links for moving the latter endwise.

5. In a corn shocker the combination with a frame having a vertical slot or opening therethrough, of the downwardly moving leaves in rear of said opening, mounted on longitudinal axes and constituting the receiving platform, the rock-shafts extending in line with the axes of the leaves, lateral arms on the rear ends of the rock-shafts extending beneath the leaves, crank arms on the forward ends of the rock shafts, transversely extending links overlapping at their inner ends beneath the slot in the frame and connected to the crank arms, a vertically moving lever sustained by the frame, and connections extending from said lever through the slot in the frame and joined to the links.

In testimony whereof I hereunto set my hand, this 22d day of October, 1894, in the presence of two attesting witnesses.

PATRICK MULLANE.

Witnesses:
GEO. D. DUNN,
CHARLES J. DUNN.